3,202,194
SELF-LOCKING FASTENER
Harold V. Jones, 120 N. Walnut St., Champaign, Ill.
Filed Jan. 22, 1965, Ser. No. 432,046
3 Claims. (Cl. 151—7)

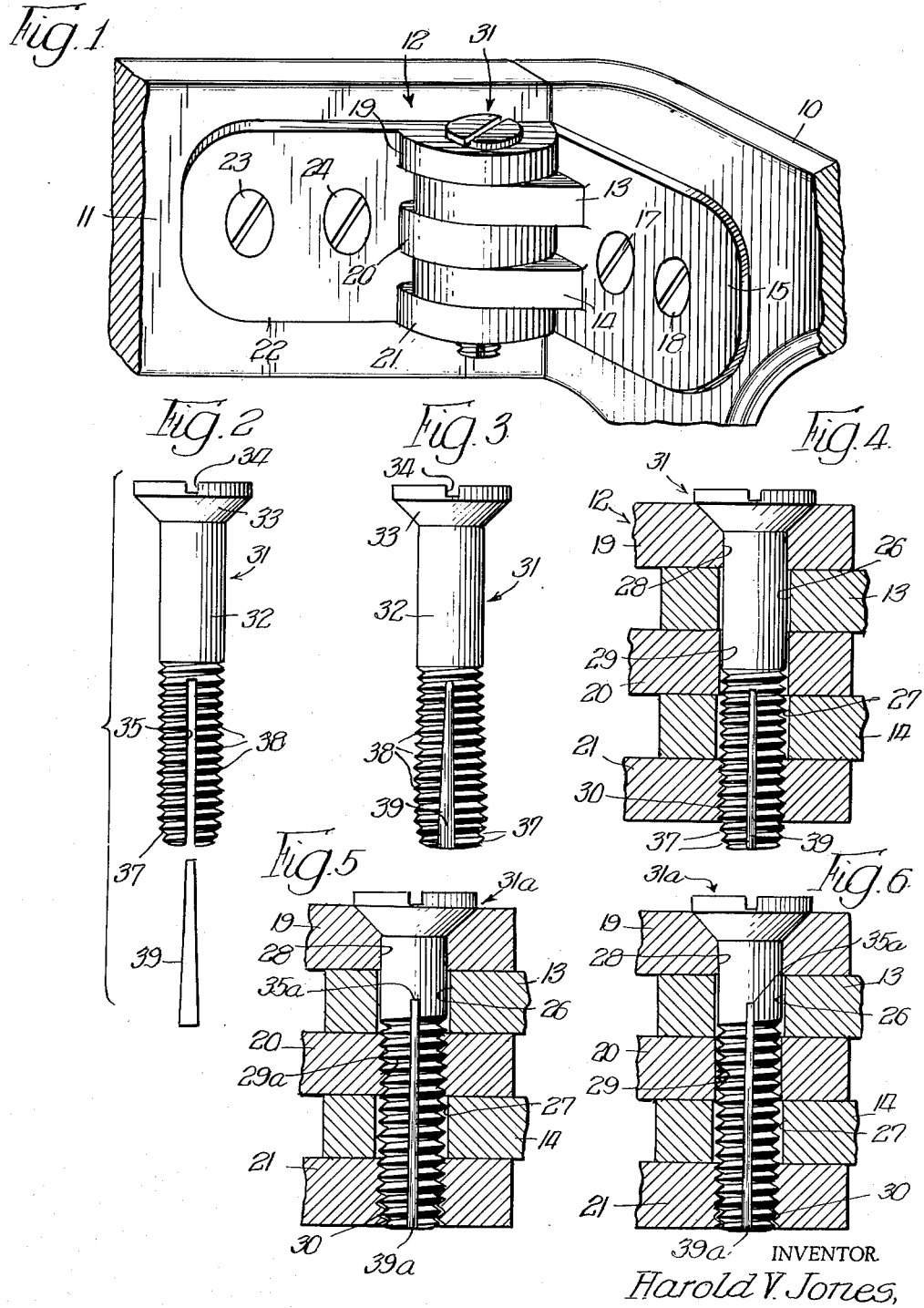

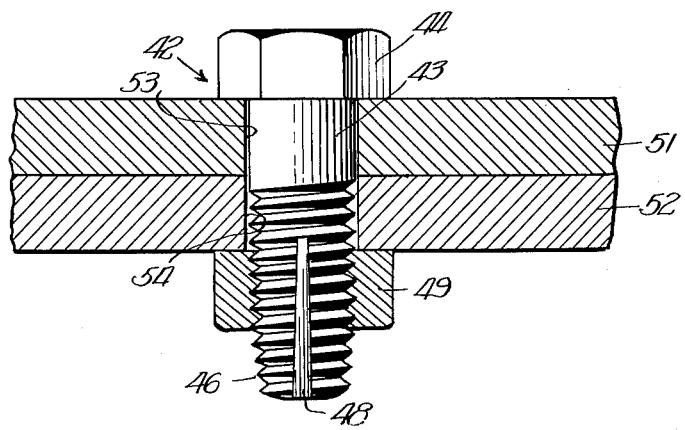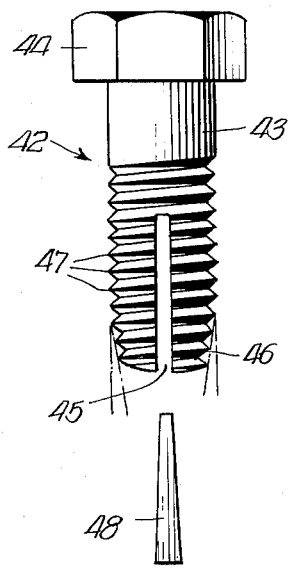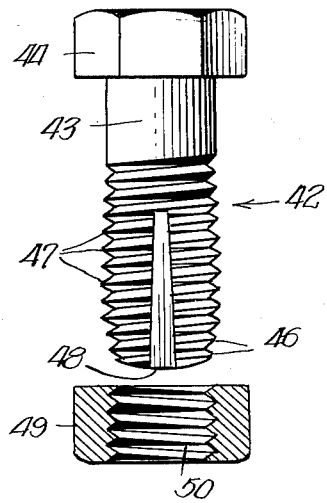

This application is a continuation-in-part of my application filed November 19, 1962, Serial No. 238,632, now abandoned.

This invention relates to self-locking fasteners, and more particularly to an improved self-locking threaded fastener of unitary construction.

This invention has general application for all threaded fasteners of the type characterized by a head and a shank, which shank is externally threaded along the end thereof remote from the head. However, because of the very nature of the self-locking fastener of this invention in which separate locking means is not required on an associated interiorly threaded member, the fastener has been found to have particular utility in assembling relatively small articles, such as eyeglasses, which cannot be conveniently provided with locking means.

It is a primary object of this invention to provide a male threaded fastener having improved means for forming a self-locking engagement with an associated interiorly threaded member.

It is a further object of this invention to provide a self-locking, male, threaded fastener having means for easily starting the fastener in threading engagement with an associated interiorly threaded member and for forming a secure locking engagement with the associated member when the male fastener is threaded therein.

It is an even further object of this invention to provide a male threaded fastener having improved self-locking means adapting the fastener for making a great number of locking engagements with an associated interiorly threaded member, thereby providing a fastener with self-locking action, which fastener can be used over and over again.

These and other objects and advantages of the invention will become apparent from the following specification wherein like numerals refer to similar parts throughout.

In the drawings:

FIG. 1 is a fragmentary perspective view showing an eyeglass frame and temple member hingedly secured together by a five barrel hinge, which hinge is held together and prevented from separating by an embodiment of the fastener of this invention;

FIG. 2 is an exploded side elevation of an embodiment of the self-locking fastener of this invention;

FIG. 3 is a side elevation of the fastener of FIG. 2 showing the same fully assembled;

FIG. 4 is a vertical section through the five barrel hinge of FIG. 1 showing the fastener of FIGS. 2 and 3 in place therein;

FIG. 5 is a vertical section similar to FIG. 4 but showing a modified barrel hinge and a modification of the fastener of this invention;

FIG. 6 is a vertical section taken through the barrel hinge of FIG. 1 showing the modified form of the fastener of this invention in place therein;

FIG. 7 is a sectional view showing a second modification of the fastener of this invention threadingly engaging a nut for securing two structural members together;

FIG. 8 is an exploded side elevation of the self-locking fastener shown in FIG. 7; and FIG. 9 is a side elevation of the self-locking fastener of FIG. 7 showing the same fully assembled and aligned with an associated interiorly threaded member.

FIG. 1 fragmentarily shows an eyeglass frame 10 and a temple member 11 hingedly secured to each other by a five barrel hinge generally designated 12. The hinge includes a pair of parallel spaced-apart barrels 13 and 14, which barrels are secured to a hinge plate 15. The plate 15 is adapted to be secured to the rear face of the eyeglass frame 10 by a pair of screws 17 and 18. The hinge 12 also includes three parallel spaced-apart barrels 19, 20 and 21, which barrels are secured to a hinge plate 22. The hinge plate 22 is secured to the temple piece 11 by a pair of screws 23 and 24. The barrels 13 and 14 are adapted to interfit between the spaces defined by the barrels 19, 20 and 21 for forming the completed hinge 12.

As best seen in FIG. 4, the barrels 13 and 14 are provided with non-threaded coaxial apertures 26 and 27, respectively. Similarly, the barrels 19, 20 and 21 are provided with coaxial apertures 28, 29 and 30, respectively, whereby when all of the barrel members are interfitted a continuous bore is formed for reception of a fastener therein. Preferably, the bore 28 is countersunk for reception of the tapered head of a fastener member, and the bore 30 is interiorly threaded for threading engagement with a fastener used in the five barrel hinge. It will be realized that the bores 26 and 27 are slightly larger in diameter than the diameter of the fastener used, thereby allowing easy rotation of the barrels 13 and 14 with respect to the barrels 19, 20 and 21.

An embodiment of the threaded fastener of this invention adapted for use in the hinge 12 is shown in FIG. 2. This embodiment will be seen to include a male threaded fastener, generally designated 31. The fastener includes a generally elongated shank 32 having an outwardly flared head 33 at one end thereof, which head contains a slot 34. The shank 32 is provided with an axially extending open sided slot 35, which slot has parallel confronting faces and extends from the end of the shank remote from the head 33 for a substantial distance along the shank. The bifurcated tip of the shank is exteriorly threaded and tapered by providing a few threads 37, which threads extend for a short distance from the extreme end of the shank and increase in diameter from that end. The bifurcated end of the shank is also provided with a plurality of external threads 38 of uniform diameter, which uniform threads continue from the first mentioned threads for a substantial distance along the shank 32.

A wedge 39 of resiliently compressible material, such as nylon, is adapted to be received within the slot 35 for expanding the same. The wedge increases uniformly in thickness along the length thereof, and it has a thickness at one end thereof greater than the height of the slot 35 for gradually expanding the same as best seen in FIG. 3. It will be realized that a variety of shapes and sizes of the slot and wedge may be provided as long as the result of inserting the wedge in the slot is the expanding of the latter.

The degree of expansion of the slot will depend upon, inter alia, the amount of locking action desired and the compressibility of the wedge material used. It will be understood that the shank 32 is not spread beyond its elastic limit during insertion of the wedge. In other words, the slotted portion of the shank attempts to return to its cylindrical form and therefore squeezes the wedge for retaining the same in slot 35. Preferably, the wedge 39 is adapted to fill completely the slot 35, and the wedge is tapered at the sides thereof in a manner similar to the taper at the tip of the shank 32, i.e. the side edges of the wedge are adapted to lie within the confines of the slot, thereby precluding interfrence between the wedge and the threads of an interiorly threaded associated member.

Before the wedge 39 is inserted in place in the slot 35, the uniform threads 38 of the fastener 31 are of a diameter adapting them for threading engagement with interior threads of an associated member. When the wedge 39 is inserted in place for gradually expanding the slot 35, laterally opposed segments of the uniform threads 38 are spread apart beyond the diameter of the threads in the associated member. The shaped and resiliency of the wedge 39 are such that when the wedge is fully seated in the slot 35, laterally opposed segments of the first one or two threads of the threads 37 on the shank 32 will be spread apart for interfitting with the threads in the associated member. The tapered threads 37 permit the bifurcated end of the shank 32, when the wedge is in place therein, to be started in threading engagement with the associated member. As the associated member is threaded onto the threads 37 and then threaded beyond the threads 37 onto the threads 38, the associated member will forcibly contract the slotted or bifurcated portion of the shank 32 against the resiliently compressible wedge 39, thereby tightly securing the associated member and the fastener 31 together.

As seen in FIG. 4, the fastener 31 is adapted to be used in the assembly of the hinge 12 by inserting the fastener downwardly in the bore formed by the coaxial apertures in the barrels making up the hinge. Since the threaded end of the shank 32 is expanded by the wedge 39, it is necessary to force the fastener somewhat and rotate the same for passing the fastener through the bores 28 and 29. Even though the threaded portion of the shank is in its expanded condition the first few threads 37 thereon easily start with the interior threads formed in the bore 30, since the laterally opposed segments of the threads 37 in their spread apart configuration are adapted to interfit with the interior threads in the bore 30. As the fastener 31 is threaded downwardly into the bore of the hinge, the interfitting engagement of the first few threads 37 of the shank with the threads in the bore 30 results in forcibly contracting the slotted portion of the shank against the resiliently compressible wedge 39, thereby allowing laterally opposed segments of the threads 38 to be squeezed together where they will resume their normal diameter for threading engagement with the interior threads in the bore 30, which last mentioned threads are of the same diameter as the uniform threads 38. The fastener 31 is then completely threaded in place. Preferably the fastener 31 is of a length allowing the tapered tip thereof, i.e., the first few threads 37, to extend from beneath the lowermost barrel 21 when the fastener is fully seated in place. In this manner, all of the interior threads of the bore 30 will be threadingly engaged with corresponding uniform threads 38, thereby insuring a tight and secure fit between the fastener and the threaded bore 30 in the lowermost barrel 21.

FIG. 5 illustrates a modified form of the hinge 12 in which a modification of the fastener 31 is received. The hinge shown in FIG. 5 is the same in all respects as the hinge illustrated in FIG. 4, except that in the modified hinge the bore in the barrel 20 is threaded, as indicated at 29a. The modified fastener, generally designated 31a, is identical with the fastener 31, except the slot 35a in the fastener 31a is longer than the slot 35 of the fastener 31 and the entire length of the modified fastener is shorter than the length of the fastener 31. The reduced length of the fastener 31a allows the bifurcated tip of the modified form of the fastener to be flush with the underside of the barrel 21 when the fastener 31a is fully threaded in place. Because of the increased length of the axially extending slots 35a of the fastener shown in FIG. 5, laterally opposed segments of the threads 38 within the barrel 20 are spread apart by the wedge 39a for tightly interfitting with the threads in the bore 29a. Again, the slotted shank of fastener 31a is not spread beyond its elastic limit in receiving the wedge; the action of the wedge alone serves to urge the laterally opposed segments of fasteners 31a in tight engagement with the threads of an associated fastener.

Since the modified fastener 31a has the bifurcated tip thereof in flush engagement with the underside of the barrel 21, only a few of the shank threads 38 of uniform diameter engage the threads in the bore 30 of the lowermost barrel member. However, the combined action of the threads 38 engaging the threads of the bore 29a and a few of the threads of the bore 30 is more than sufficient for tightly securing the threaded fastener 31a in place. The modified fastener 31a and the modified hinge structure shown in FIG. 5 may be employed if it is found objectionable to allow the bifurcated tip of the fastener to project below the lowermost barrel, as is the case with the fastener 31 shown in FIG. 4.

FIG. 6 illustrates the modified fastener 31a in place in the hinge illustrated in FIGS. 1 and 4. Here, because of the increased length of the slot and wedge, sufficient locking action is obtained by the action of the wedge 39a urging laterally opposed segments of the threads 38 into engagement with the non-threaded bore 39 and a few threads of the threaded bore 30.

FIGS. 7, 8 and 9 illustrate a second modification of the fastener of this invention, which second modification is similar in its over-all appearance to a conventional bolt. This modification, generally designated 42, includes a shank 43 having a hexagonal head 44 at one end thereof. The shank 43 is provided with an axially extending open sided slot 45, which slot has parallel confronting faces and extends from the end of the shank remote from the head 44 for a substantial distance along the shank. The bifurcated tip of the shank is exteriorly threaded and tapered by providing a few threads 46, which threads extend for a short distance from the extreme end of the shank and increase in diameter from that end. The bifurcated end of the shank is also provided with a plurality of external threads 47 of uniform diameter, which uniform threads continue from the first mentioned threads for a substantial distance along the shank 43.

A wedge 48 of resiliently compressible material, which is similar to the wedge 39, is adapted to be received within the slot 45 for expanding the same. The wedge provided is uniformly tapered, and it has a thickness at one end thereof greater than the height of the slot 45 for gradually expanding the same in the manner described in connection with the fastener 31. The wedge 48 is adapted to fill completely the slot 45, and the wedge is tapered at the sides thereof in a manner similar to the taper at the tip of the shank 43, i.e., the side edges of the wedge are adapted to lie within the confines of the slot, thereby precluding interference between the wedge and the threads of an interiorly threaded associated member, such as a conventional nut 49.

Before the wedge 48 is inserted in place in the slot 45, the uniform threads 47 of the fastener 42 are of a diameter adapting them for threading engagement with interior threads 50 of the nut 49. When the wedge 48 is inserted in place for gradually expanding the slot 45 as seen in FIG. 9, laterally opposed segments of the uniform threads 47 are spread apart beyond the diameter of the threads 50. The shape and resiliency of the wedge 48 are such that when the wedge is fully seated in the slot 45, laterally opposed segments of the first one or two threads of the threads 46 will be spread apart for interfitting with the threads 50 in the nut 59. As in the other embodiments of the invention, the slotted portion of shank 43 is not spread beyond its elastic limit during inserting wedge 48.

The tapered threads 46 permit the bifurcated end of the shank 43, when the wedge is in place therein, to be started in threading engagement with the nut 49. As the nut is threaded onto the threads 46 and then threaded beyond these threads onto the threads 47, the nut will forcibly contract the slotted or by bifurcated portion of the shank 43 against the resiliently compressible wedge 48, thereby tightly securing the nut 49 on the fastener 42 for securing two members together, such as the plate members 51 and 52 having aligned openings 53 and 54, respectively, as illustrated in FIG. 7. It should be readily apparent that by this construction a tight fit will be formed between the shank threads 47 and the threads 50 of the nut 49.

Thus it will be seen that by this invention a self-locking fastener of unique construction has been provided. The fastener will securely lock with the interior threads in an associated member in such a way as to practically make impossible unintentional separation of the fastener from the associated member. The wedge of resiliently compressible material, such as nylon or the like, is adapted to remain in the axially extending slot in the shank of the fastener for the entire life of the fastener. The locking action is not brought about by deforming the fastener beyond its elastic limit. The wedge alone serves to urge the slotted, threaded shank in an expanded configuration for locking engagement with an associated fastener. Because the wedge and the slot are not deformed or damaged in any way by threading engagement of the fastener shank with the interior threads of an associated member, the self-locking fastener may be used over and over again.

While the invention has been shown in but one form, it will be obvious to those skilled in the art that it is not to be so limited, but on the contrary it is susceptible of various changes and modifications without departing from the spirit and scope of the appended claims.

I claim:

1. In a threaded fastener of the type having a head and a shank, the construction comprising, said shank being provided with a longitudinally extending slot which initially has parallel faces and which extends for a substantial distance from the end of the shank toward the head and is open at the end and at the sides of the shank, threads at said end of the shank, which threads extend for a short distance from the end of the shank and increase in diameter from said end, other threads of larger diameter which continue along the slotted portion of the shank from the first mentioned threads, and a one-piece tapered wedge of resiliently compressible material fitted into said slot and yieldably engaging said slot faces so that the latter diverge toward said end of the shank, thereby yieldably maintaining laterally opposed segments of the first mentioned threads spread apart to interfit with threads in an associated interiorly threaded member, and also yieldably maintaining laterally opposed segments of the second mentioned threads spread apart beyond the diameter of the threads in said associated member, the action of said wedge constituting the sole force yieldably holding said laterally opposed segments apart in spread relation, whereby when said associated member is threaded onto the first mentioned threads and then threaded beyond said first mentioned threads onto the second mentioned threads it will forcibly contract the slotted portion of the shank against the wedge to return said faces to their initially parallel relation, thereby securing the associated member tightly in place, said segments being spread apart by the wedge to an extent less than their elastic limit, whereby said wedge is retained in the slot by the squeezing action of said segments thereon.

2. The construction according to claim 1 wherein said wedge is retained in said slot by the squeezing action of said shank thereon.

3. The construction according to claim 1 wherein said wedge is substantially wholly disposed within the confines of said slot.

References Cited by the Examiner

UNITED STATES PATENTS

| | | | |
|---|---|---|---|
| 2,266,758 | 12/41 | Holtz | 151—31 |
| 2,407,160 | 9/46 | Kahn | 151—7 |
| 3,039,508 | 6/62 | Greene | 151—7 |

CARL W. TOMLIN, *Primary Examiner.*

EDWARD C. ALLEN, *Examiner.*